United States Patent [19]

Lohr

[11] 3,720,405

[45] March 13, 1973

[54] HYDRO-PNEUMATIC SPRING

[75] Inventor: Manfred Lohr, Letmathe, Germany

[73] Assignee: Hoesch Aktiengesellschaft, Dortmund, Germany

[22] Filed: Feb. 24, 1971

[21] Appl. No.: 118,301

[30] Foreign Application Priority Data

March 5, 1970 Germany.....................P 20 10 339.3

[52] U.S. Cl. ..............................................267/64 R
[51] Int. Cl. ................................................F16f 9/10
[58] Field of Search...................................267/64, 65

[56] References Cited

UNITED STATES PATENTS

| | | | |
|---|---|---|---|
| 3,554,524 | 1/1971 | Riehl | 267/64 |
| 3,391,920 | 7/1968 | Schmid | 267/64 |

*Primary Examiner*—James B. Marbert
*Attorney*—Michael S. Striker

[57] ABSTRACT

A hydro-pneumatic spring for use in automobiles has an internal chamber one end of which is open. A cover closes the open end and an annular supporting element is accommodated in the chamber at the other end. A tubular flexible divider is accommodated in the chamber extending longitudinally thereof and having a smaller diameter than the chamber to subdivide the same into an inner and an outer compartment. Mounting beads at opposite ends of the flexible divider are connected to the inner side of the annular supporting element and to the cover, respectively. A piston is displaceably accommodated in the inner compartment and an annular supporting ring of synthetic plastic material is accommodated between the annular supporting element and the inner surface bounding the chamber and projects in part axially beyond the annular supporting element in the direction towards the cover.

9 Claims, 4 Drawing Figures

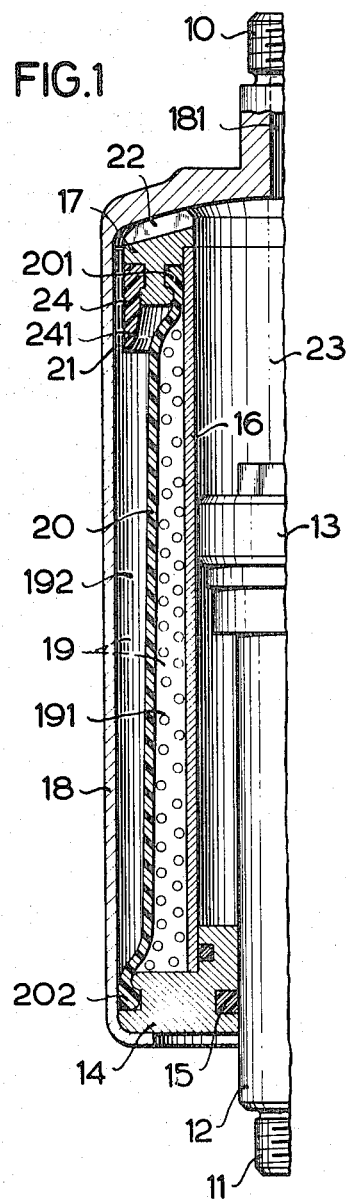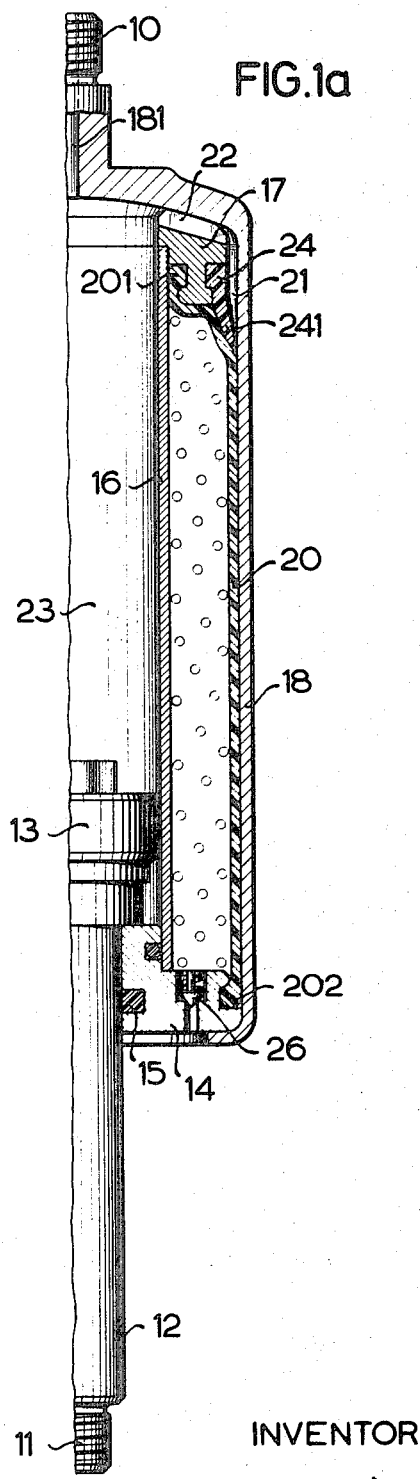

INVENTOR
MANFRED LOHR

HYDRO-PNEUMATIC SPRING

BACKGROUND OF THE INVENTION

The present invention relates generally to springs, and more particularly to hydro-pneumatic springs. Still more specifically the present invention relates to a hydropneumatic spring which is with particular advantage —but not exclusively— suitable for use in automotive vehicle.

Hydro-pneumatic springs for foreign-actuated, level regulating hydro-pneumatic suspensions in motor vehicles and the like are already known. Such devices, which find use as shock absorbers and the like, utilize a piston which is displaced in a chamber, and they have a gas-filled compartment separated from a liquid-filled compartment by an elastic flexible divider. In these prior-art constructions it is necessary that on filling of the gas compartment the flexible divider be capable of being supported on surfaces which do not have sharp edges, apertures or the like in order to avoid damage. This is particularly necessary when for instance the vehicle provided with such device must be raised on a lift or the like beyond the operating stroke of the device.

In one prior art construction, known from German Allowed Application 1,205,846, a plate-shaped diaphragm is used for separating the gas and the liquid, and the gas-containing space is arranged in the longitudinal axis of the spring and is of essentially spherical configuration. In the aforementioned allowed application the plate-shaped membrane is pressed in the filled condition of the device onto the connecting bores which connect the liquid-containing space, the gas-containing working space and the damping space. If, under such circumstances, the diaphragm should be damaged for any reason, gas is lost and the device becomes inoperative.

U.S. Pat. No. 3,309,108 attempts to overcome this difficulty by reinforcing the diaphragm with a metallic component. This, however, has the disadvantage that in such a construction an additional juncture or sealing location between the gas space, the working space and the liquid-containing space must be sealed and that, in addition to providing the metallic component, this results in increased expenses in the construction of the spring.

Another allowed German application 1,150,484 utilizes a radially arranged diaphragm and a tubular divider element which separates an outer gas working space from an inner liquid working space, and wherein the diaphragm during operation of the device is pressed against the openings which lead to the damping valve so that in this construction also damage to the diaphragm may occur with resultant inoperativeness of the device.

SUMMARY OF THE INVENTION

It is, accordingly, an object of the present invention to overcome the disadvantages of the prior art.

More particularly it is an object of the present invention to provide an improved hydro-pneumatic spring which is not possessed of the above-mentioned disadvantages.

An additional object of the invention is to provide such an improved hydro-pneumatic spring wherein the elastic divider element is so supported that the possibility of damage thereto is avoided, and that this is avoided with a minimum of structural requirements so that the device can be simple and therefore also inexpensive.

In pursuance of the above objects, and of others which will become apparent hereafter, one feature of the invention resides in a hydro-pneumatic spring which, briefly stated, comprises wall means defining an internal chamber having spaced ends one of which is open and bounded by an inner circumferential face. A cover closes this one end and an annular supporting element is located in the chamber at the other end thereof and has an outer peripheral face juxtaposed with the inner circumferential face, and an inner peripheral face. A tubular flexible divider is also located in the chamber having a small diameter than the same and dividing it into an inner and an outer compartment. The divider has beads at its opposite ends which are respectively connected with the cover and the inner peripheral face. A piston is displaceably accommodated in the inner compartment and an annular supporting ring surrounds and is secured to the outer peripheral face and projects in part beyond the annular supporting element towards the cover.

The annular supporting ring is preferably of synthetic plastic material and the part thereof which projects beyond the annular supporting element is of lip-shaped or collar-shaped configuration.

Where the part of the annular supporting ring projects axially beyond the annular supporting element, the outer surface of the annular supporting ring may be provided with a circumferentially extending incision or groove to enhance the ability of this part to be deflected with reference to the remainder of the ring.

According to a further embodiment of the invention the annular supporting ring and the annular supporting element may be made of one piece with one another, both consisting of synthetic plastic material.

By resorting to the present invention a reliable non-damaging support of the elastic divider element at the requisite pressure is obtained and the danger of damage is avoided. Also, the abutment of the elastic divider element against the wall means defining the chamber, the synthetic plastic annular element and the synthetic plastic annular ring whose contours can be made of very precise dimensional measurements, the deviation of the spring from the intended value of the gas filling volume can be very small whereby more precise characteristic lines of the gas spring action are obtained.

The novel features which are considered as characteristic for the invention are set forth in particular in the appended claims. The invention itself, however, both so as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a longitudinal section through one half of a spring according to one embodiment of the present invention, being shown in one position where the piston is inwardly displaced;

FIG. 1a is a view similar to FIG. 1 but showing the other half of the spring with the piston in another position in which it is outwardly displaced;

DESCRIPTION OF THE PREFERRED EMBODIMENTS

Figure 2:
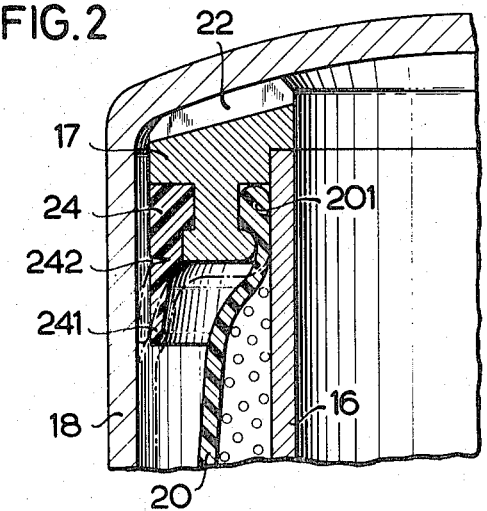
FIG. 2 is a fragmentary detail view of FIGS. 1 and 1a, on an enlarged scale.

Discussing now the drawing in detail, and firstly the embodiment illustrated in FIGS. 1, 1a and 2 thereof, it will be seen that the hydro-pneumatic spring here has an upper mounting arrangement 10 and a lower mounting arrangement 11. The mounting arrangement 10 may be utilized for connecting the spring to the chassis of a vehicle and the mounting arrangement 11 may be utilized for connecting the spring to an axle of the vehicle, or vice versa. A tubular outer wall 18 defines an interior chamber one end of which is closed by a cover 14 through which a piston rod 2 carrying a damping piston 13 passes, sealing being effected by a piston rod seal 15 of known construction. An inner tubular or cylindrical member 16 extends axially through the chamber and is connected at its opposite ends with the cover 14 and with an annular supporting element 17. It defines with the outer wall 18 and outer working space 19 which is separated by the elastically yieldable tubular divider element 20 into a gas working space 191 and a liquid working space or compartment 192. The latter communicates via an annular chamber 29 and apertures 22 with an inner operating or working space 23 in which the piston 13 is located.

One end of the element 20 is provided with a bead 201 by means of which it is connected with the inner peripheral surface of the annular supporting element 17; the opposite end of the element 20 is also provided with a bead 202 by means of which it is sealingly connected with the outer circumferential surface of the cover 14 in conjunction with the elements 16 and/or 18.

As the drawing shows (see particularly FIG. 2) the outer circumferential or peripheral surface of the annular supporting element 17 is provided with a supporting ring 24 of synthetic plastic material which extends in part axially beyond the annular supporting element 17 in the direction towards the cover 14. The portion or part of the ring 24 which so projects consists of soft elastically yieldable material and has the form of a lip or collar 241; of course, the remainder of the ring 24 may also consist of such soft material or it may consist of a harder material. It is advantageous to provide an annular incision or groove 242 as shown in FIG. 2 in the outer surface of the ring 24, in the region where the collar 241 thereof projects beyond the annular supporting element 17 in axial direction. The configuration in cross-section of the groove 242 is such that when the collar portion 241 is deflected outwardly so as to abut against the inner side of the tubular wall 18, the lateral flanks of the groove 242 will abut one another.

It will be appreciated that while FIG. 1 shows only the left-hand half of the illustrated device, and FIG. 1a shows only the right-hand half, the device is mirror-symmetrical and that FIGS. 1 and 1a actually show both halves of the device with the only difference being that in the two Figures the piston 13 is located in different positions.

Figure 3:
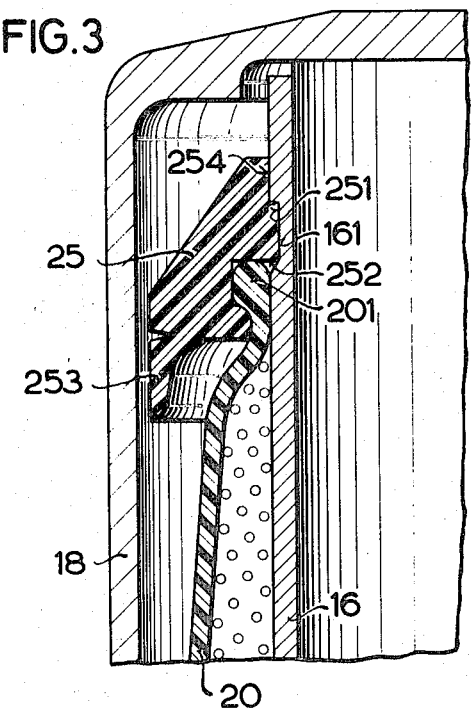
FIG. 3 is a view similar to FIG. 2 but illustrating a further embodiment of the invention.

Coming to the embodiment in FIG. 3 it will be seen that here the elements 17 and 24 of FIGS. 1 and 2 are configured as a single one-piece component 25. Advantageously an inwardly extending circumferential abutment 251 of the annular component 25 is received in a circumferential recess 161 of the inner tubular member 16 after the elastical-yieldable separating element 20 or divider element 20 has been press-fitted with its bead 201 into an annular groove 252 provided for this purpose in the inner peripheral surface of the component 25.

A collar 253 of the component 25 is provided for supporting the divider element 20 and the forces which develop when the element 20 abuts against the outer tubular wall 18 there is provided the abutment 251 and a recess which forms the step 254 which defines a shoulder with the abutment 251. This shoulder abuts against and is supported by the outer surface of the component 16.

The operation of the device of which two embodiments have been illustrated by way of example, will already be obvious from the foregoing description. When oscillations take place between the axle and the chassis of the vehicle, liquid is displaced in accordance with the corresponding piston movement from the inner working space 23 through the apertures 22 and the annular channel 21 into the liquid working compartment or space 192 or, conversely, out of this compartment 192 into the working space 23. This causes a corresponding change in the gas-working space or compartment 191.

If the vehicle is lifted for repair, inspection, or other purposes, then the level regulating device acts in that the element 20 abuts against the inner surface of the wall 18 and displaces the soft elastically yieldable collar 241 of the ring 24 in FIGS. 1 and 2 sealingly against the inner surface of the wall 18a, as shown in FIG. 1. Due to its configuration the element 20 will abut against the inner wall of the component or element 18 in the region of the cover 14 and such abutment will extend to the vicinity of the annular supporting element 17. This displacement of the collar 241 into sealing engagement with the inner wall or surface of the outer element 18 causes a further movement of liquid out of the compartment 192 to be prevented, and provides a proper non-damaging support for the component 20.

The same takes place when the spring element is manufactured. After it is assembled it is filled with pressure gas through the inlet valve 26 and the liquid which is accommodated in the space 192 at such time is displaced outwardly through the annular channel 29, the apertures 82 and the bore 181. Because the liquid in the spring is not pressurized while the component 20 abuts the inner surface of the wall or element 18, only a simple plug is needed for storage and transportation of the spring to close the bore 181.

It will be understood that each of the elements described above, or two or more together, may also find a useful application in other types of constructions differing from the types described above.

While the invention has been illustrated and described as embodied in a hydro-pneumatic spring, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A hydro-pneumatic spring, particularly for use in automobiles, comprising wall means defining an internal chamber bounded by an inner circumferential face and having spaced ends one of which is open; a cover closing said one end; an annular supporting element in said chamber at the other end thereof and having an outer peripheral face juxtaposed with said inner circumferential face, and an inner peripheral face; a tubular flexible divider in said chamber having a smaller diameter than the same and an outer circumferential face, said tubular divider being electrically displaceable between a normal operating position dividing said chamber into an inner and an outer compartment and another position in which said outer circumferential face is in surface-to-surface contact with said inner circumferential face, said divider having beads at its opposite ends which are respectively connected with said cover and said inner peripheral face; a piston displaceably accommodated in said inner compartment; and an annular supporting rim surrounding and secured to said outer peripheral face and having a part configurated as a collar projecting beyond said annular supporting element toward said cover, said collar defining with said inner circumferential face an annular clearance when said tubular divider is in said normal operating position and abuttingly engaging said inner circumferential face when said tubular divider is in said other position thereof.

2. A spring as defined in claim 1, wherein said annular supporting ring is composed of synthetic plastic material.

3. A spring as defined in claim 2, wherein at least the synthetic plastic material of said collar is flexible.

4. A spring as defined in claim 2, said outer peripheral face and said annular supporting ring having mating coupling portions.

5. A spring as defined in claim 2, said annular supporting element having an end facing toward said cover; and wherein said annular supporting ring has an outwardly directed surface provided in the region of said end of said annular supporting element with a circumferential groove.

6. A spring as defined in claim 2, wherein said annular supporting element and said annular supporting ring are of one piece with one another.

7. A spring as defined in claim 6, said inner peripheral surface having a peripheral recess accommodating one of said beads, and being provided intermediate said peripheral recess and said other end of said chamber with a step forming a peripheral shoulder.

8. A spring as defined in claim 1; further comprising a tubular member coaxially located within said inner compartment and defining a piston compartment, with said piston being located in said piston compartment.

9. A spring as defined in claim 8; and passage means connecting one of said compartments with said piston compartment.

* * * * *